(12) United States Patent
Dwork

(10) Patent No.: US 11,389,032 B2
(45) Date of Patent: Jul. 19, 2022

(54) DISPOSABLE CUTTING BOARD AND CUTLERY

(71) Applicant: Michael D. Dwork, New York, NY (US)

(72) Inventor: Michael D. Dwork, New York, NY (US)

( * ) Notice: Subject to any disclaimer, the term of this patent is extended or adjusted under 35 U.S.C. 154(b) by 306 days.

(21) Appl. No.: 15/963,169

(22) Filed: Apr. 26, 2018

(65) Prior Publication Data

US 2018/0310774 A1 Nov. 1, 2018

Related U.S. Application Data

(60) Provisional application No. 62/491,309, filed on Apr. 28, 2017.

(51) Int. Cl.
| | |
|---|---|
| *A47J 47/00* | (2006.01) |
| *B27M 3/24* | (2006.01) |
| *B27M 1/08* | (2006.01) |
| *B27D 1/04* | (2006.01) |
| *B27D 5/00* | (2006.01) |
| *B26B 3/02* | (2006.01) |
| *A47G 21/02* | (2006.01) |
| *A47G 21/04* | (2006.01) |

(52) U.S. Cl.
CPC ............. *A47J 47/005* (2013.01); *B27D 1/04* (2013.01); *B27D 5/003* (2013.01); *B27M 1/08* (2013.01); *B27M 3/24* (2013.01); *A47G 21/023* (2013.01); *A47G 21/04* (2013.01); *B26B 3/02* (2013.01)

(58) Field of Classification Search
CPC ........ A47J 47/00; A47J 47/005; A47J 36/022; A47J 36/025
See application file for complete search history.

(56) References Cited

U.S. PATENT DOCUMENTS

| | | | |
|---|---|---|---|
| 2,343,740 A | 3/1944 | Birmingham | |
| 2,346,040 A | 4/1944 | Montague | |
| 6,695,299 B1 * | 2/2004 | Brotz | A47J 47/005 269/289 R |
| 2008/0301965 A1 * | 12/2008 | Taylor | A47J 47/005 33/566 |
| 2009/0162680 A1 | 6/2009 | Zheng et al. | |

(Continued)

FOREIGN PATENT DOCUMENTS

| | | | |
|---|---|---|---|
| CN | 203106895 U | * | 8/2013 |
| DE | 20111918 U1 | | 11/2001 |

(Continued)

OTHER PUBLICATIONS

Knowledge Bank. "Reconstituted Wood" Definition. https://knowledgebank.materialbank.com/terms/reconstituted-wood/ (Year: 2021 ).*

(Continued)

*Primary Examiner* — Tyrone V Hall, Jr.
(74) *Attorney, Agent, or Firm* — Merchant & Gould P.C.

(57) ABSTRACT

A disposable cutting board and a process for the manufacture of the disposable cutting board are disclosed. The disposable cutting board includes a center layer, a first outer layer, and a second outer layer. The center layer has opposed outer surfaces and is made from a block of wood which is substantially free of sugar, lathed, and sanded. At least the first outer layer is a wax paper and is bonded to one of the outer surfaces of the center layer for forming the disposable cutting board. In another aspect, disposable cutlery and a process for the manufacture of the disposable cutlery are disclosed. The disposable cutlery is made from a block of wood substantially free of sugar, lathed, sanded, and impregnated with wax.

12 Claims, 10 Drawing Sheets

(56) References Cited

U.S. PATENT DOCUMENTS

| | | | | |
|---|---|---|---|---|
| 2009/0194925 A1* | 8/2009 | Rolf | ...................... | A47J 47/005 |
| | | | | 269/302.1 |
| 2012/0164427 A1* | 6/2012 | Hudson | ................. | B32B 29/005 |
| | | | | 428/221 |
| 2015/0361309 A1* | 12/2015 | Combs | ................... | C09J 101/10 |
| | | | | 156/336 |

FOREIGN PATENT DOCUMENTS

| | | | | | |
|---|---|---|---|---|---|
| WO | 2005004686 A1 | | 1/2005 | | |
| WO | WO-2005004686 A1 | * | 1/2005 | ............ | A47J 47/005 |
| WO | 2005020764 A1 | | 3/2005 | | |
| WO | 2013084514 A1 | | 6/2013 | | |
| WO | WO-2013084514 A1 | * | 6/2013 | ............ | A47J 47/005 |

OTHER PUBLICATIONS

Int'l Prelim. Report on Patentablility in PCT/US2018/029540, dated Oct. 29, 2019, 15 pages.

Int'l Search Report in PCT/US2018/029540, dated Jul. 9, 2018, 7 pages.

Written Opinion of the Int'l Searching Authority in PCT/US2018/029540, dated Jul. 9, 2018, 16 pages.

Frame snapshots from video "How wood veneer is made . . . ", https://www.youtube.com/watch?"v=AdYDslhy2VU, <accessed May 22, 2021>, CabinetParts.com (2010).

Comm, pursuant to Art. 94(3) EPC, Appln. No. 18 725 080.8, dated Sep. 4, 2021, 6 pages.

\* cited by examiner

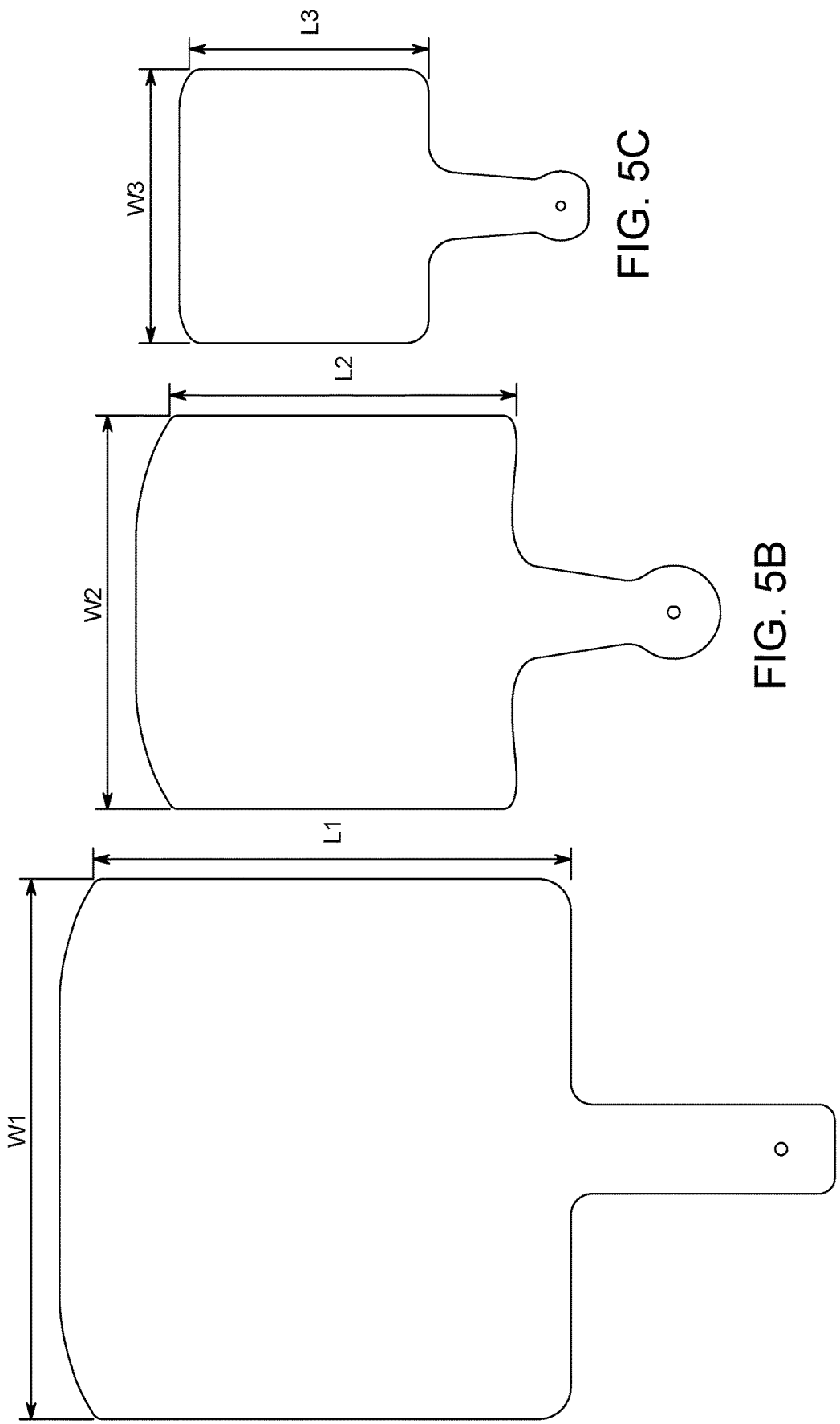

DISPOSABLE CUTTING BOARD AND CUTLERY

CROSS-REFERENCE TO RELATED APPLICATIONS

This application claims priority to U.S. Provisional Patent Application 62/491,309 filed Apr. 28, 2017, the disclosure of which is incorporated herein by reference in its entirety.

BACKGROUND

Cutting boards are typically made from wood, bamboo, plastic, or stone. Wood cutting boards are often manufactured using solid wood planks or "end-cut" pieces of wood that are chemically treated and glued together. Wood is a renewable resource, although not nearly as easily renewable as bamboo. Some wood cutting boards are made from waste wood (e.g., leftovers at the mill that would have been otherwise thrown away). It is generally known that a softwood board is kind to knives, and will keep them sharper longer. However, wood cutting boards are generally thick, heavy, expensive, relatively difficult to sanitize, and require maintenance of sanding and oiling to prevent drying and cracking.

Bamboo is the choice of many environmentalists. A hard grass, it is a sustainable, renewable resource that needs no chemicals to thrive or to be harvested. Since bamboo cutting boards absorb less liquid than wooden boards, many believe bamboo boards are at least as sanitary as wooden cutting boards. However, bamboo is significantly harder than traditional maple, which means it is also harder on knives. Also, the small grooves may ever-so-slightly catch a knife, interrupting a smooth cutting action. In addition, it is common for bamboo cutting boards to fall apart and crack easily.

Cutting boards can also be made of plastic. It is generally known that more bacteria collect on plastic surfaces than on wood surfaces. Although a new plastic board can be disinfected, a knife-scarred plastic surface is much more difficult to clean and disinfect as bacteria can grow in micro-cervices in the plastic.

Stone cutting boards are aesthetically pleasing, but can dull knives after repeated use. Moreover, stone cutting boards are heavy and can chip.

Although the length, width, and shape of cutting boards may vary, the thickness of a typical cutting board is about 20 mm to about 30 mm. For some applications, thinner cutting boards (e.g., thinner than 20 mm) are more desirable because they are lighter and easier to handle. Thin cutting boards also occupy less space and are thus easier to store and transport.

Typical manufacturing techniques are not suitable for manufacturing thin cutting boards, such as cutting boards having a thicknesses less than 5 mm. Also, typical cutting boards do not hold up well structurally and often fall apart or split during use.

Therefore, improvements are needed for manufacturing eco-friendly cutting boards that are disposable, and that have a thickness that allows for easier handling, storage, and transport, while maintaining their original shape.

Cutlery, such as kitchen utensils and tools used for preparing, serving, and eating food including forks, spoons, and knives, and can be made from metal such as stainless steel, sterling silver, silver-plated metals, etc. While metal cutlery is reusable, it can be expensive and heavy, and is not ideal for informal gatherings such as picnics, outdoor parties, and barbecues.

Plastic cutlery is made for disposable use, and is a cheap and lightweight alternative to metal cutlery. In addition for use during informal events, plastic cutlery is also commonly used at fast-food or take-out restaurants. While plastic cutlery is convenient, it is often discarded after single use and is not biodegradable. Thus, plastic cutlery is not eco-friendly.

Wooden disposable cutlery can be used as a biodegradable alternative to plastic cutlery. However, wooden disposable cutlery can be brittle and susceptible breaking during use, and can splinter which can be uncomfortable while eating. Also, wooden disposable cutlery can give off a dry wood taste which can taint the flavor of food while eating.

Therefore, improvements are needed for manufacturing eco-friendly cutlery that is disposable, resilient to breaking and splintering, and that does not taint the taste of food.

SUMMARY

In general terms, the present disclosure is directed to a disposable cutting board. In one possible configuration and by non-limiting example, the disposable cutting board can be used as a cheeseboard, a charcuterie board, a pizza board, a cutting board, and the like.

In one aspect, the disclosed technology relates to a process for the manufacture of a disposable cutting board, including the steps of: boiling a block of wood, thereby producing a boiled block of wood; semi-drying the boiled block of wood, thereby producing a semi-dried section; lathing the semi-dried section, thereby producing a semi-dried lathed section; drying the semi-dried lathed section, thereby producing a dried lathed section; sanding the dried lathed section, thereby producing a sanded section having opposed outer surfaces; misting one of the outer surfaces of the sanded section with an adhesive; applying a wax paper over the adhesive on the outer surface of the sanded section; pressing the wax paper; drying the adhesive; and cutting the sanded section having the wax paper applied thereon into a predetermined form.

In some examples, the process further includes misting the other outer surface of the sanded section with the adhesive; and applying at least one of (i) wax paper, (ii) cork, and (iii) silicon over the adhesive applied on the other outer surface of the sanded section. In some examples, the process further includes routing at least one ridge on the sanded section.

In some examples, the lathing of the semi-dried section produces a semi-dried lathed section having a thickness in the range of 0.45-4 mm. In other examples, the lathing of the semi-dried section produces a semi-dried lathed section having a thickness in the range of 0.9-2.5 mm.

In another aspect, the disclosed technology relates to a board comprising, a first outer layer and a second outer layer, at least the first outer layer comprising a wax paper having an inner surface and an outer surface; and a center layer having opposed outer surfaces and comprising a block of wood which is (i) substantially free of sugar, (ii) lathed, and (iii) sanded; the inner surface of the first outer layer is bonded to one of the outer surfaces of the center layer.

In some examples, the second outer layer comprises a wax paper having an inner surface and an outer surface and the inner surface of the second outer layer is bonded to the other outer surface of the center layer. In some examples, the second outer layer comprises cork having an inner surface and an outer surface and the inner surface of the second outer layer is bonded to the other outer surface of the center layer. In some examples, the second outer layer comprises silicon having an inner surface and an outer surface and the inner surface of the second outer layer is bonded to the other outer surface of the center layer.

In some examples, the center layer having a thickness in the range of 0.45 mm-4.0 mm. In other examples, the center layer having a thickness in the range of 0.9 mm-2.5 mm. In some examples, the center layer having at least one ridge routed thereon.

In another aspect, the disclosed technology relates to a process for the manufacture of disposable cutlery, including the steps of: boiling a block of wood, thereby producing a boiled block of wood; semi-drying the boiled block of wood, thereby producing a semi-dried section; lathing the semi-dried section, thereby producing a semi-dried lathed section; drying the semi-dried lathed section, thereby producing a dried lathed section; sanding the dried lathed section, thereby producing a sanded section; impregnating the sanded section with a wax, thereby producing a waxed sanded section; pressing the waxed sanded section; drying the waxed sanded section; and cutting the waxed sanded section into a predetermined form.

In some examples, the process further includes the step of: routing at least one ridge on the sanded section. In some examples, the predetermined form is a fork, knife, or spoon. In some examples, wherein the sanded section is impregnated with wax using a tumble dryer.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 5A is a top view of an example disposable cutting board in accordance with certain examples of the present disclosure.

FIG. 5B is a top view of another example disposable cutting board in accordance with certain examples of the present disclosure.

FIG. 5C is a top view of another example disposable cutting board in accordance with certain examples of the present disclosure.

DETAILED DESCRIPTION

Figure 1:
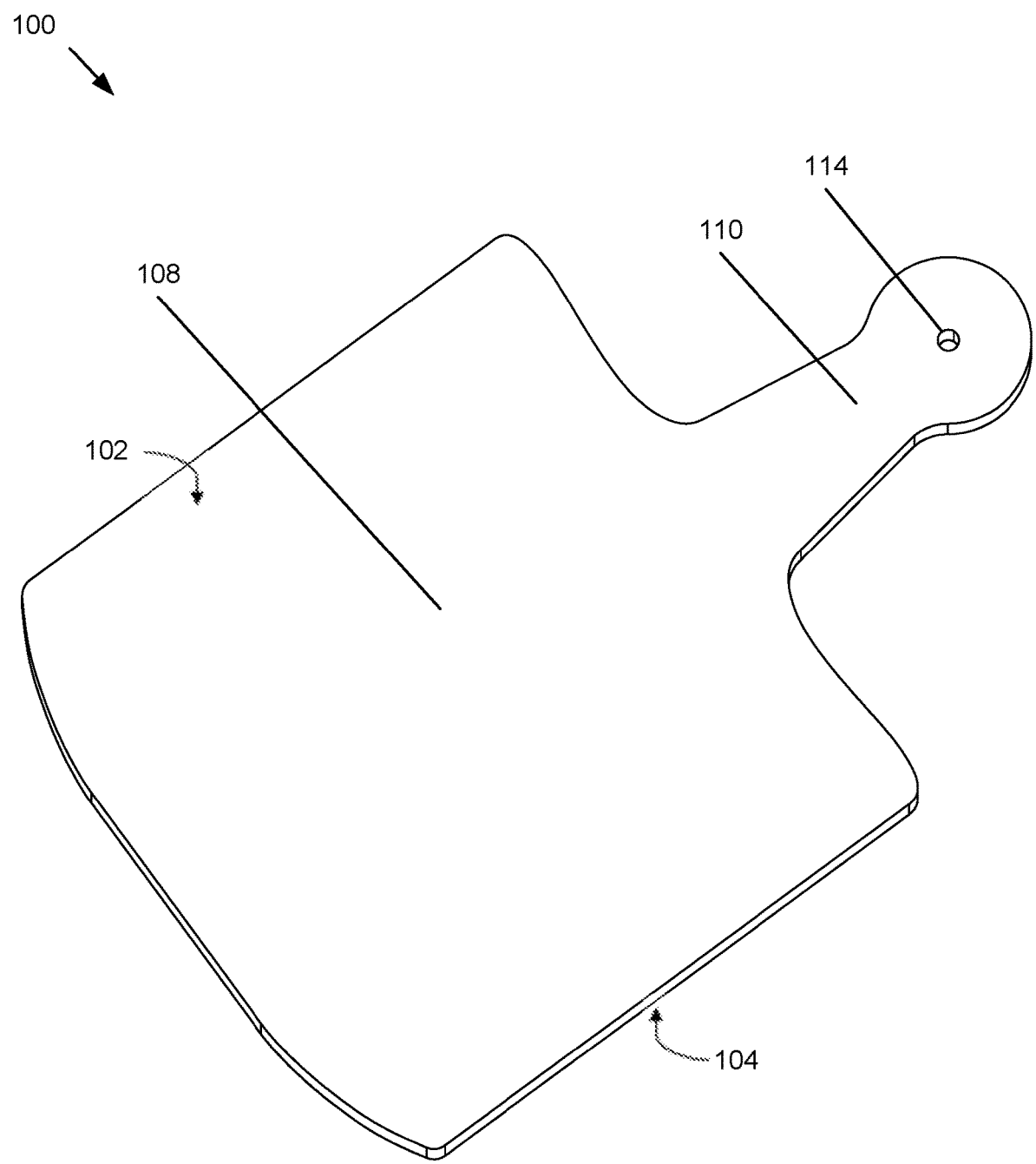
FIG. 1 is a top-front perspective view of a disposable cutting board in accordance with certain examples of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
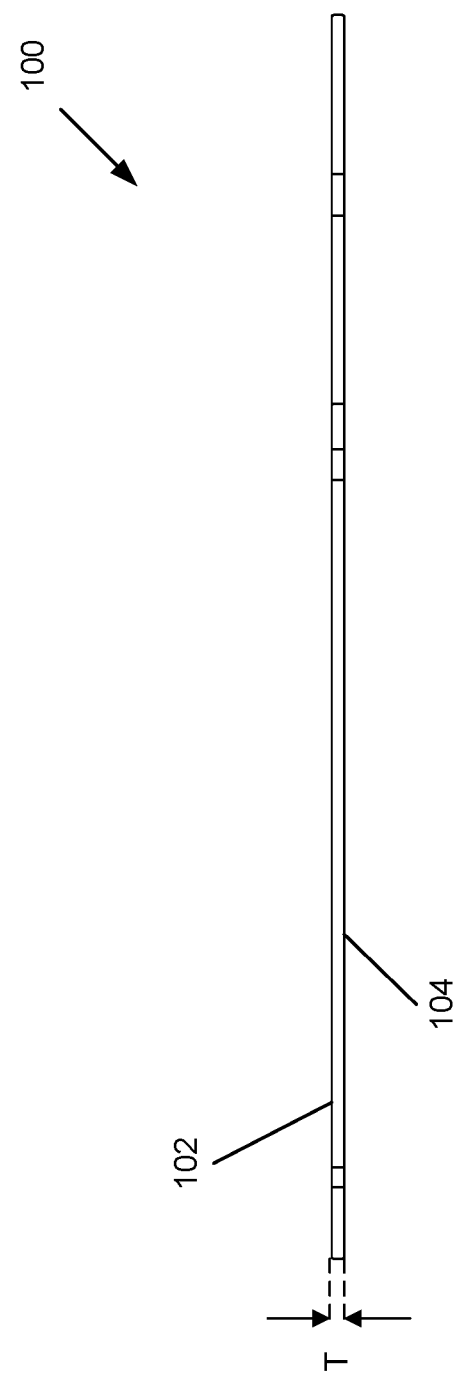
FIG. 2 is an elevated side view of a disposable cutting board in accordance with certain examples of the present disclosure.
Figure 3:
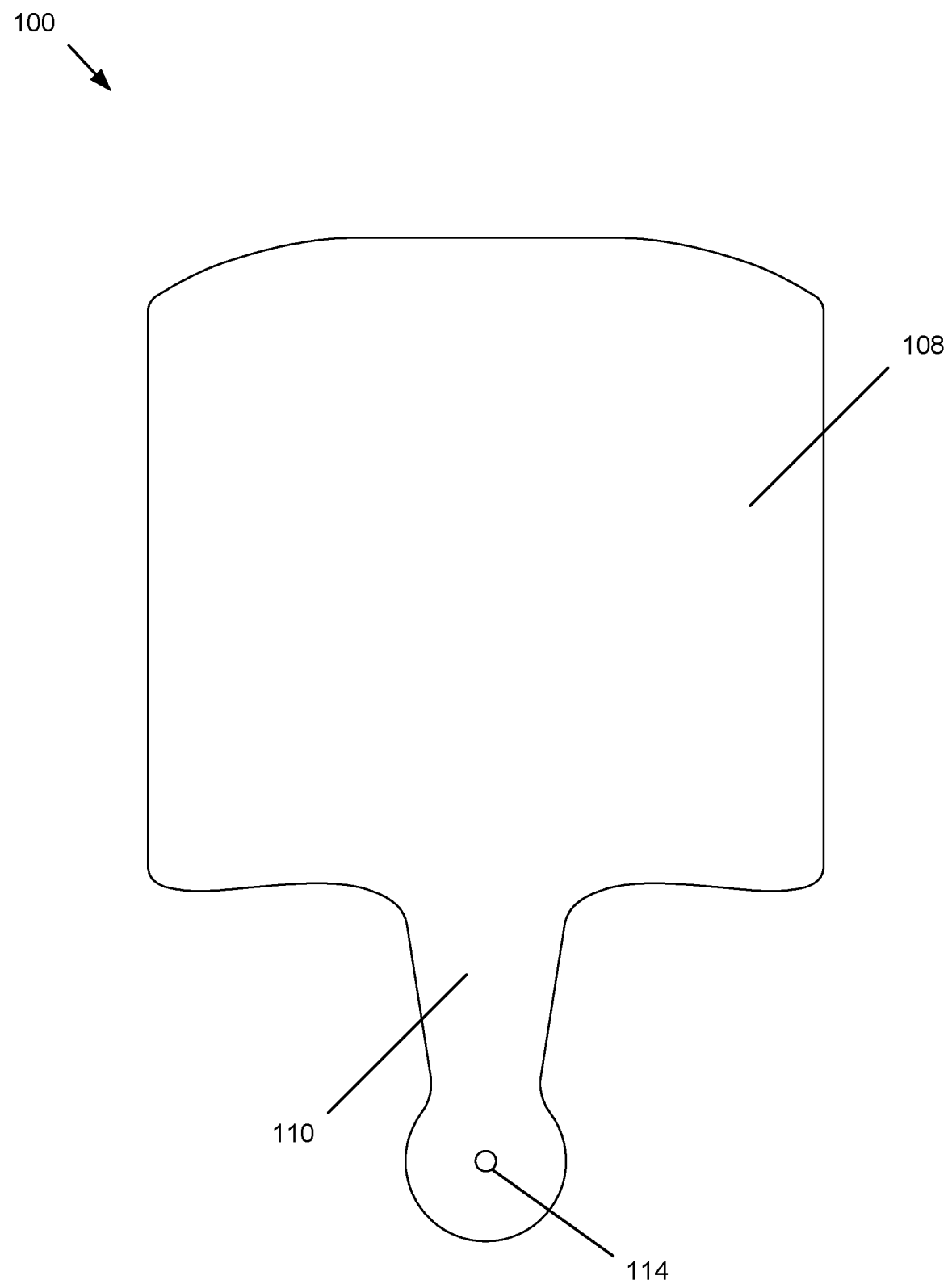
FIG. 3 is a plan view of a disposable cutting board in accordance with certain examples of the present disclosure.

FIG. 1 is a top-front perspective view of a disposable cutting board in accordance with certain examples of the present disclosure. FIG. 2 is an elevated side view of a disposable cutting board in accordance with certain examples of the present disclosure. FIG. 3 is a plan view of a disposable cutting board in accordance with certain examples of the present disclosure. As shown in FIGS. 1, 2, and 3, a disposable cutting board 100 having a thickness T includes a first side 102 and a second side 104. In certain examples, the thickness T is less than 5 mm. In other examples, the thickness T is in a range of about 0.45 mm to about 4 mm. In at least some examples, the disposable cutting board 100 can be used as a cheeseboard, a charcuterie board, a pizza board, a cutting board, or a similar type of board.

The first side 102 and the second side 104 of the disposable cutting board 100 are substantially flat, and define a support area 108 and a handle area 110. It should be understood that the support area 108 and the handle area 110 depicted in the figures are merely exemplary and not intended to be a precise outline of such areas.

Figure 4:
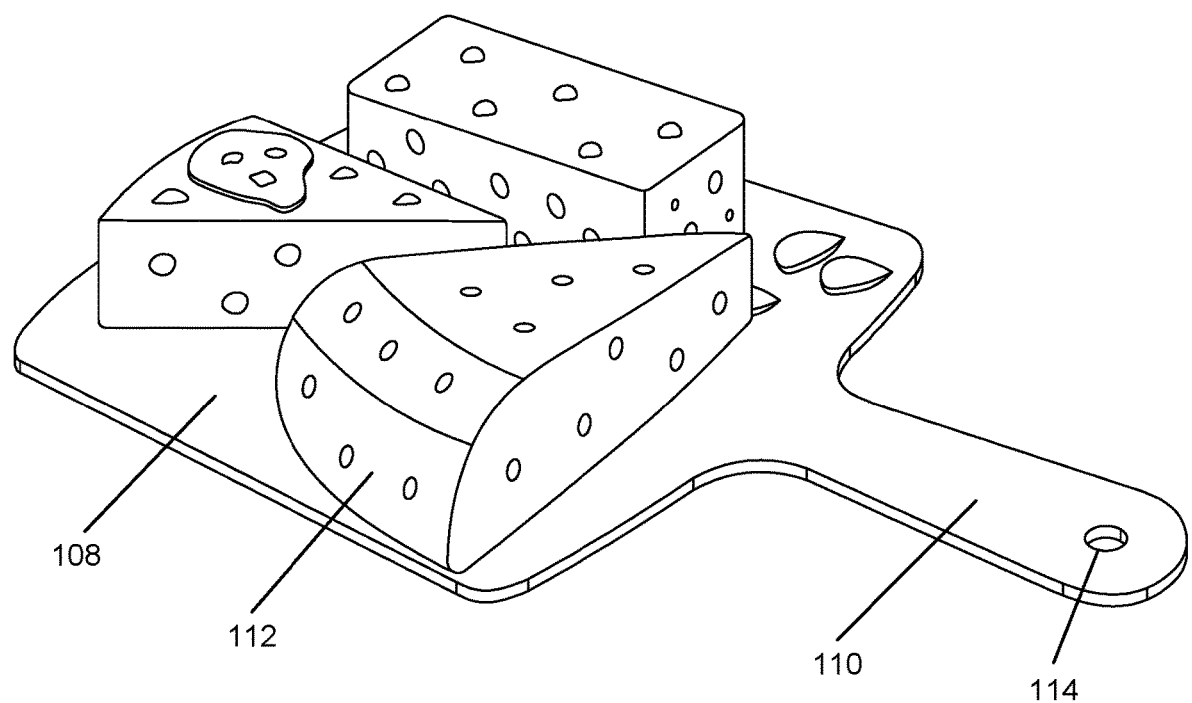
FIG. 4 is a top-rear perspective view of the disposable cutting in accordance with certain examples of the present disclosure, the board holding several food items.

FIG. 4 is a top-rear perspective view of the disposable cutting board in accordance with certain examples of the present disclosure. As shown in FIGS. 1 and 4, the support area 108 may be used to support one or more items 112 (e.g., food items) for display and/or transport by the disposable cutting board 100. For example, the support area 108 can be used to support cheese, charcuterie, pizza, meats, fruits, vegetables, bread, and other types of food items for display and transport by the disposable cutting board.

The handle area 110 can be used to handle and transport the disposable cutting board 100. In certain examples, the handle area 110 may include an aperture 114 that can be used for hanging the disposable cutting board 100 on a wall, a rack, furniture, or kitchen appliance by either directly placing the aperture 114 onto a hook, or by threading a cord through the aperture 114 and using the cord to hang the disposable cutting board 100 in a vertical orientation.

FIGS. 5A, 5B, and 5C are top views of example disposable cutting boards in accordance with certain examples of the present disclosure. As shown in FIGS. 5A-5C, in certain examples the support area 108 of the disposable cutting board 100 may have a substantially square shape such that the support area 108 includes a width W (e.g., W1, W2, W3) and a length L (e.g., L1, L2, L3) that are substantially the same. In certain example, the support area 108 may have a width W1 of about 11 inches and a length L1 of about 11 inches, or a width W2 of about 8 inches and a length L2 of about 8 inches, or a width W3 of about 5 inches and a length L3 of about 5 inches. In addition to these exemplary dimensions, other square dimensions for the support area 108 of the disposable cutting board 100 are possible, and the disposable cutting board is therefore not limited to these exemplary square dimensions.

Figure 6C:
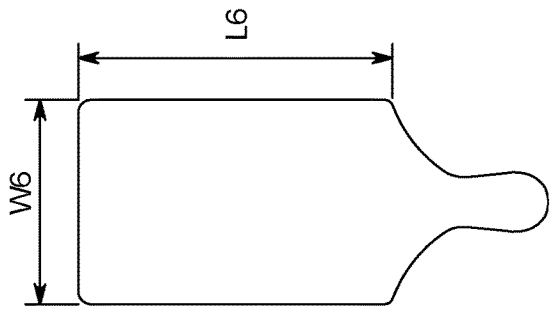
FIG. 6C is a top view of another disposable cutting board in accordance with certain examples of the present disclosure.
Figure 6B:
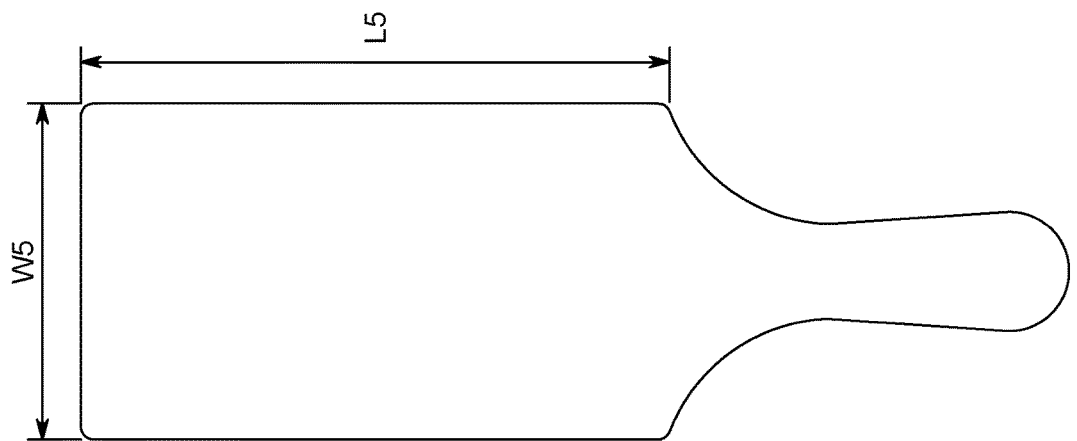
FIG. 6B is a top view of another disposable cutting board in accordance with certain examples of the present disclosure.
Figure 6A:
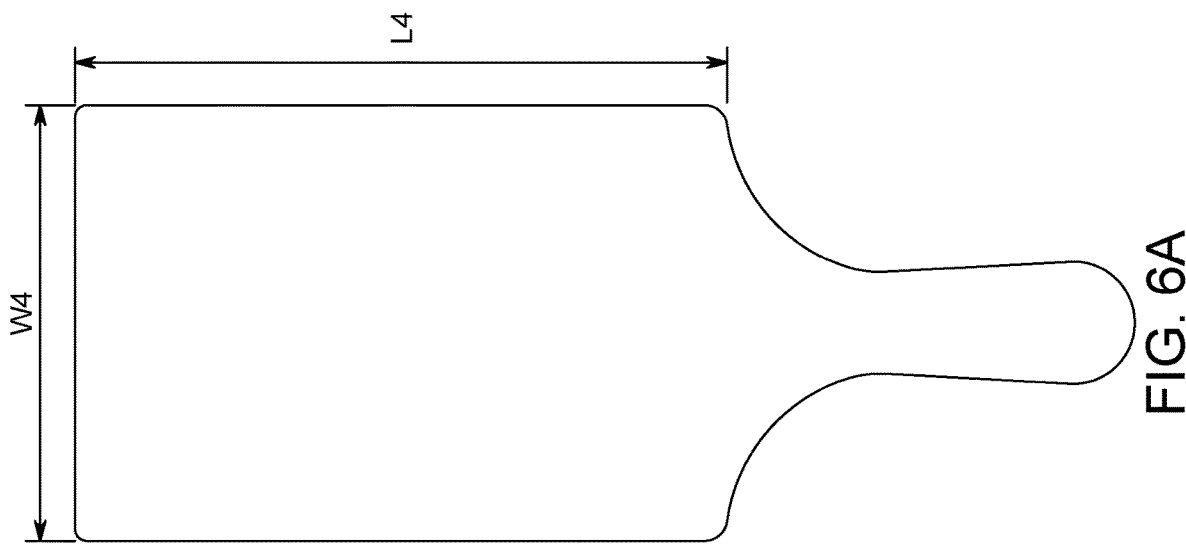
FIG. 6A is a top view of another disposable cutting board in accordance with certain examples of the present disclosure.

FIGS. 6A, 6B and 6C are top views of other disposable cutting boards in accordance with certain examples of the present disclosure. Referring now to FIGS. 6A-6C, in certain examples the support area 108 of the disposable cutting board 100 may have a substantially rectangular shape such that the support area 108 has a width W (e.g., W4, W5, W6) that is shorter than a length L (e.g., L4, L5, L6). In certain examples, the support area 108 may have a width W4 of about 8 inches and a length L4 of about 12 inches, a width W5 of about 5 inches and a length L5 of about 10 inches, or a width W6 of about 2 inches and a length L6 of about 4 inches. In addition to these exemplary dimensions, other rectangular dimensions for the support area 108 of the disposable cutting board 100 are possible, and the disposable cutting board is therefore not limited to these exemplary rectangular dimensions.

In addition to square and rectangular shapes, the support area 108 may have other types of shapes suitable for supporting and displaying food items. For example, the support area 108 may have an elliptical, circular, or oval shape for supporting and displaying food items.

Figure 7:
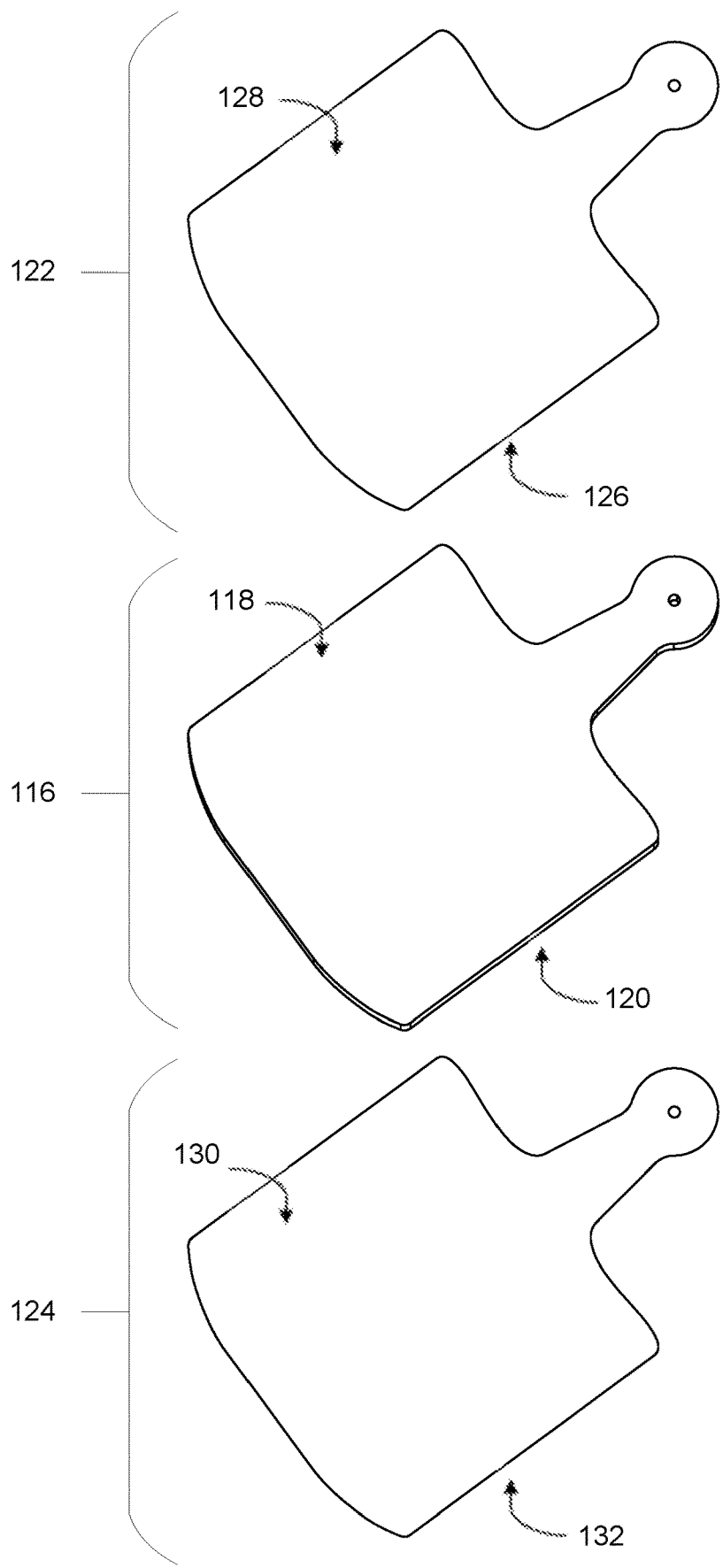
FIG. 7 is an exploded view of an example disposable cutting board in accordance with certain examples of the present disclosure.

FIG. 7 is an exploded view of an example disposable cutting board in accordance with certain examples of the present disclosure. As shown in FIG. 7, the disposable cutting board 100 has a center layer 116 having a first outer surface 118 and a second outer surface 120.

The center layer 116 is made from a section of a tree substantially free of sugar, and that has been lathed and sanded. In certain examples, the center layer 116 is made from a soft or medium type of wood. In some examples, the center layer 116 is made from wood cut from an aspen tree or from a birch tree. In certain examples, the center layer 116 is made from wood cut from an *albizia falcataria* tree or a similar type of tree.

In some examples, the center layer 116 has a thickness of about 0.45 to about 4 mm. In other examples, the center layer 116 has a thickness of about 0.45 to about 3.2 mm. In other examples, the center layer 116 has a thickness of about 0.9 to about 2.5 mm.

In certain examples, the center layer 116 of the disposable cutting board 100 may include one or more ridges routed on at least one of the first outer surface 118 and the second outer surface 120. The one or more ridges are grooves around the outer edge of the center layer 116. The additional surface area from the one or more ridges provides additional structural support for the disposable cutting board 100. The one or more ridges allow the disposable cutting board 100 to be well supported and secured inside a refrigerator. Also, the one or more ridges may help to counteract the natural tendency of the center layer 116 to warp, which in turn, may help to counteract the effects of moisture and oils from, for example, meats and cheeses.

The disposable cutting board 100 further includes a first outer layer 122 and a second outer layer 124. The first outer layer 122 includes an inner surface 126 and an outer surface 128. The inner surface 126 of the first outer layer 122 is bonded to at least one of the first and second outer surfaces 118, 120 of the center layer 116. In some examples, the first outer layer 122 is bonded to center layer 116 with an adhesive, and is pressed to remove air bubbles between the first outer layer 122 and the center layer 116, to create a tight bond between the first outer layer 122 and the center layer 116. In certain examples, a multi-ton press or a suitable roller press is used to press the first outer layer 122 and the center layer 116 together.

In the example of FIG. 7, the inner surface 126 of first outer layer 122 is bonded to the first outer surface 118 of the center layer 116. Alternatively, the inner surface 126 of the first outer layer 122 may be bonded to the second outer surface 120 of the center layer.

The second outer layer 124 has an inner surface 130 and an outer surface 132. The inner surface 130 of the second outer layer 124 is bonded to least one of the first and second outer surfaces 118, 120 of the center layer 116. In some examples, the second outer layer 124 is bonded to center layer 116 with an adhesive, and thereafter is pressed to remove air bubbles between the second outer layer 124 and the center layer 116, to create a tight bond between the second outer layer 124 and the center layer 116. In certain examples, a multi-ton press or a suitable roller press is used to press the second outer layer 124 and the center layer 116 together.

In the example of FIG. 7, the inner surface 130 of the second outer layer 124 is bonded to the second outer surface 120 of the center layer 116. Alternatively, the inner surface 130 of the second outer layer 124 may be bonded to the first outer surface 118 of the center layer 116.

In some examples, both the first outer layer 122 and the second outer layer 124 are made from a wax paper. The wax paper improves the flatness and stability of the disposable cutting board 100 by sealing the first outer surface 118 and the second outer surface 120 of the center layer 116. The wax paper may also provide the disposable cutting board 100 with better structural integrity such that it does not fall apart or split during use.

In certain examples, the first and second outer layers 122, 124 are made from a rice based wax paper. In certain examples, the first and second outer layers 122, 124 are made from a wax paper having a thickness in a range of about 0.1 mm to about 0.15 mm.

In alternative examples, the first outer layer 122 is made from a wax paper, and the second outer layer 124 is made from a non-slip material such as cork or silicon for providing a non-slip surface on the disposable cutting board 100. In certain examples, the first outer layer 122 is made from a wax paper having a thickness in a range of about 0.1 mm to about 0.15 mm, and the second outer layer 124 is made from a non-slip material.

Figure 8:
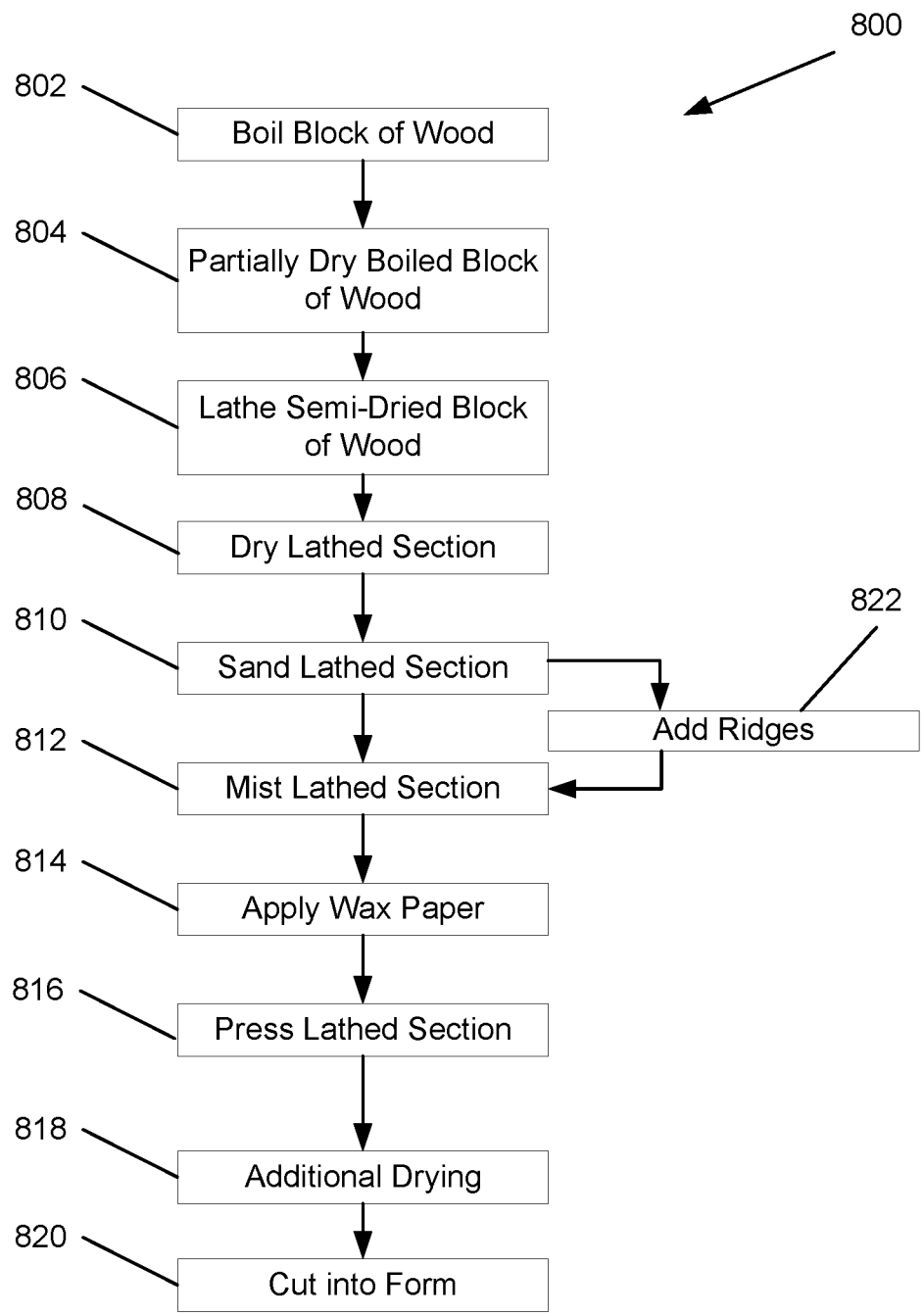
FIG. 8 illustrates a process for manufacturing a disposable cutting board.

Referring now to FIG. 8, a process 800 for manufacturing a disposable cutting board is depicted. The process 800 includes a step 802 of boiling a block of wood such as a section of a tree to remove sugars contained in the block of wood. In certain examples, the block of wood is cut from the stump or trunk of a soft or medium type of wood. In some examples, the block of wood is cut from the stump or trunk of an aspen tree, a birch tree, an *albizia* falcataria tree, or another similar type of tree. Using a single piece of wood, such as the boiled block of wood, instead of planks or end-cut pieces of wood produces a more durable cutting board that can withstand and sustain repeated impacts from knives and other kitchen utensils typically used for cutting and processing food items supported by the cutting board.

The process 800 includes a step 804 of partially drying the boiled block of wood. In some examples, an industrial dryer is used to partially dry the boiled block of wood. In other examples, the boiled block of wood is dried naturally on its own (i.e., without using any machinery). In some examples, the boiled block of wood is dried both naturally and using an industrial dryer.

Next, the process 800 includes a step 806 of lathing the semi-dried block of wood to produce a semi-dried lathed section. Using a lathe allows a thin ribbon of wood to be used.

In certain examples, the lathing of the semi-dried block of wood produces a semi-dried lathed section having a thickness in a range of about 0.45 mm to about 4 mm. In another example, the lathed section has a thickness in a range of about 0.45 to about 3.2 mm. In yet another example, the lathed section has a thickness in a range of about 0.9 to about 2.5 mm.

The process 800 further includes a step 808 of drying the lathed section. In some examples, an industrial dryer is used to dry the lathed section. In other examples, the lathed section is dried naturally (i.e., without using any machinery). In some examples, the lathed section is dried both naturally and using an industrial dryer.

Thereafter, the process 800 includes a step 810 of sanding the lathed section. In certain examples, an industrial sander is used to sand the lathed section.

In some examples, the process 800 includes a step 822 of adding one or more ridges to at least a portion of the lathed section. In some examples, the one or more ridges are grooves around the outer edge of the lathed section. The additional surface area from the one or more ridges provides additional structural support for the disposable cutting board. Also, the one or more ridges may help to counteract the natural tendency of the wood to warp, which in turn, may help to counteract the effects of moisture and oils from, for example, meats and cheeses In certain examples, an industrial router is used to add the ridges to the lathed section before the step 810 of sanding the lathed section. In other examples, an industrial router is used to add the ridges to the lathed section after the step 810 of sanding the lathed section.

The process 800 includes a further step 812 of misting the sides of the lathed section with an adhesive. In some examples, the adhesive is a starch based adhesive, such a rice based adhesive. In some examples, any water based adhesive can be used. As used herein, adhesive includes, but is not limited to any binder, glue, and the like. In certain examples, a mister or misting system can be used to mist the lathed section with the adhesive.

Next, the process 800 includes a step 814 of applying a wax paper over the adhesive on both sides of lathed section. In some examples, the wax paper is a rice based wax paper. In certain examples, the wax paper has a thickness in a range of about 0.1 mm to about 0.15 mm.

Next, the process 800 includes a step 816 of pressing the wax paper to remove air bubbles for creating a tight bond between the wax paper and the lathed section, and to also make the wax paper have a smooth surface. In some examples, a multi-ton press or a suitable roller press is used to press the wax paper onto the lathed section.

The wax paper seals the surface of the lathed section and ensures the flatness and stability of the disposable cutting board. The wax paper may also provide the disposable cutting board with better structural integrity so that it does not fall apart or split during use.

In alternative examples, the wax paper is applied on only one side of the lathed section, while another material is applied over the other side of the lathed section. In certain examples, a non-slip material such as cork, silicon, etc. is applied to one side of the lathed section to provide a non-slip surface, while the other side of the lathed section is sealed with the wax paper.

Next, the process 800 includes an additional drying step 818. In certain examples, an industrial dryer is used to dry the lathed section with the adhesive and the wax paper applied thereto. In other examples, the lathed section with the adhesive and the wax paper applied thereto is dried naturally (i.e., without using any machinery). In some examples, the lathed section with the adhesive and the wax paper is dried both naturally and using an industrial dryer.

Next, the process 800 includes a step 820 of cutting the dried lathed section with the wax paper applied thereto into a predetermined form. The predetermined form may have the shape of a disposable cutting board, such as, for example, the disposable cutting boards depicted in FIGS. 5A-5C and FIGS. 6A-6C. In certain examples, the lathed section with the wax paper applied thereto is cut using a die cutter or a clicking machine for forming the predetermined form.

Figure 9:
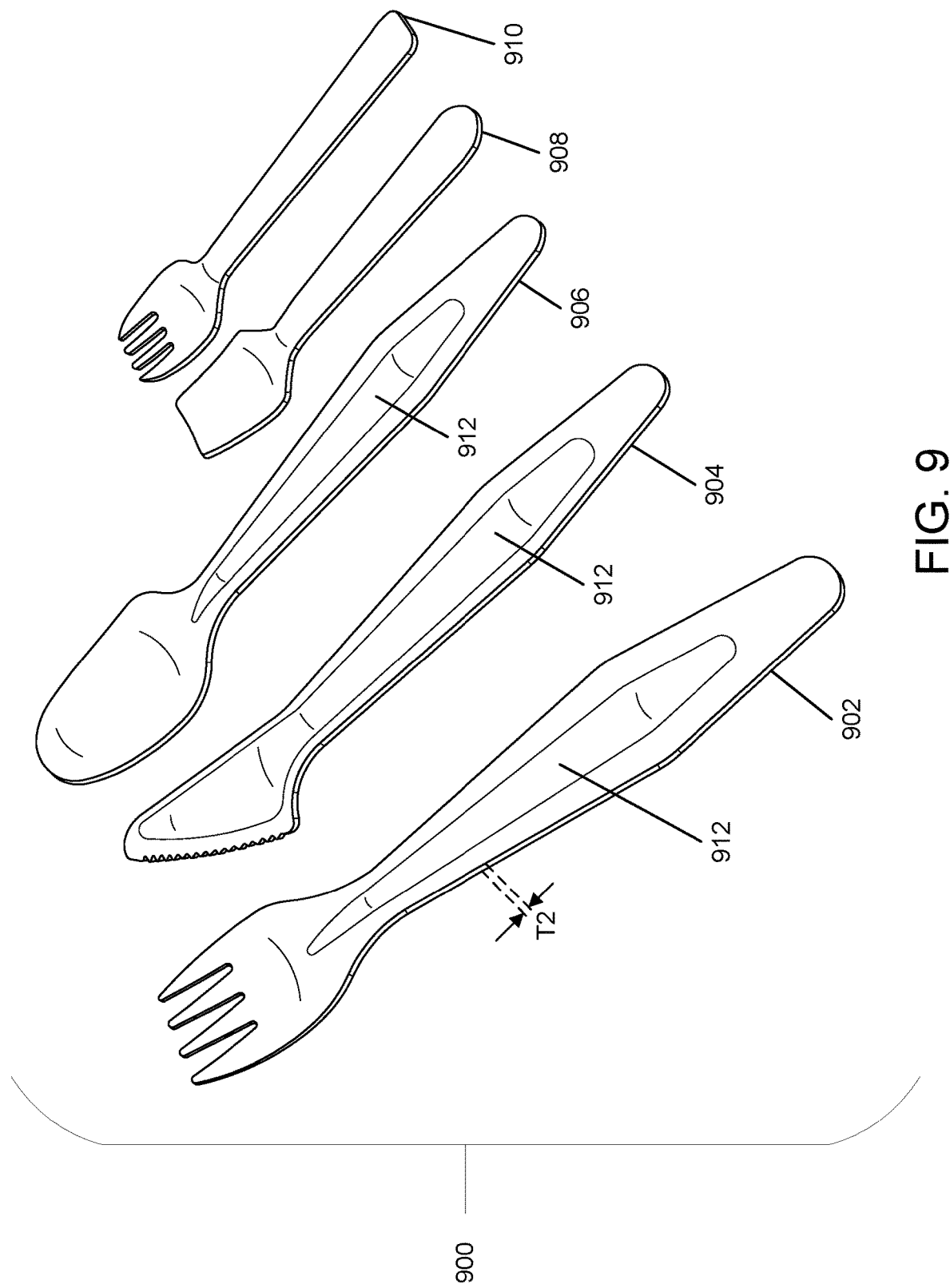
FIG. 9 is a top-front perspective view of disposable cutlery in accordance with certain examples of the present disclosure.

FIG. 9 is a top-front perspective view of disposable cutlery 900 in accordance with certain examples of the present disclosure. As will be described in more detail, the disposable cutlery 900 can be made from a process substantially the same as process 800 except that instead of applying an adhesive and wax paper, the disposable cutlery 900 is impregnated with wax.

As shown in FIG. 9, the disposable cutlery 900 includes a fork 902, a knife 904, a spoon 906, a tasting spoon 908, and a tasting fork 910. While forks, knives, and spoons are shown and described herein, the disposable cutlery 900 can include any type of kitchen utensil and tool used for preparing, serving, and eating food including, but not limited to, forks, knives, and spoons.

Like the disposable cutting board described above, the disposable cutlery 900 is made from a section of a tree that is substantially free of sugar and that has been lathed and sanded. The disposable cutlery 900 can be made from a soft or medium wood. In some examples, the disposable cutlery 900 is made from wood cut from an aspen tree, a birch tree, an *albizia falcataria* tree, and/or another similar type of tree.

In some examples, the disposable cutlery 900 has a thickness T2 of about 0.8 mm to about 1.5 mm. In certain examples, the thickness T2 is about 1.0 mm to about 1.2 mm.

In some examples, the disposable cutlery 900 may include one or more ridges 912. The one or more ridges 912 provide additional structural support for the disposable cutlery 900 that can help prevent the disposable cutlery 900 from breaking or splintering during using. Also, the one or more ridges 912 can help to counteract the natural tendency of the wood to warp due to moisture and oils from food, and can improve the re-usability of the disposable cutlery 900.

The disposable cutlery 900 is impregnated with a wax, and is pressed to remove air bubbles from the wood and to shape the disposable cutlery 900. Removal of the air bubbles from the wood and the impregnated wax further strengthens the disposable cutlery 900. In certain examples, the disposable cutlery 900 is impregnated with a wax such as a food grade wax including, but not limited to, Carnauba wax, beeswax, soy based wax, etc.

Figure 10:
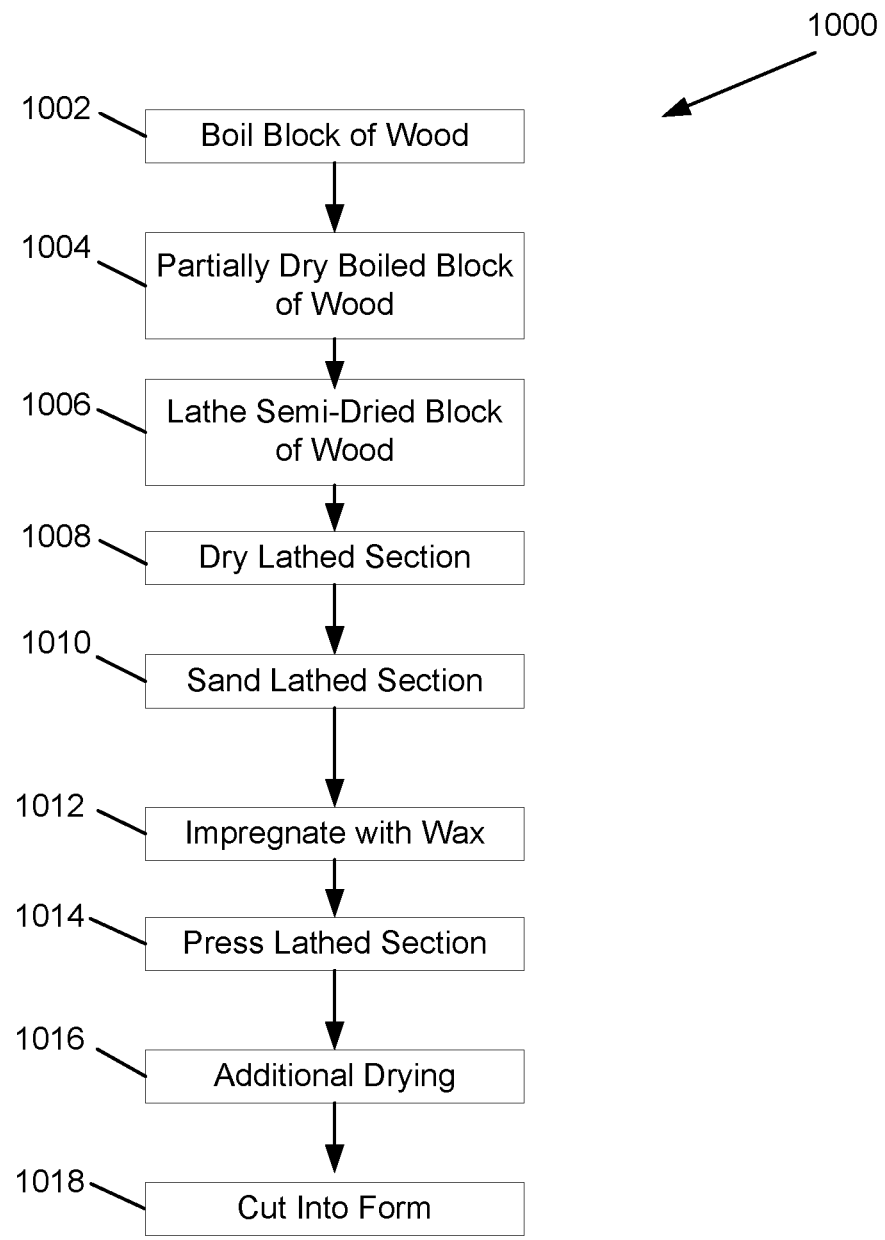
FIG. 10 illustrates a process for manufacturing disposable cutlery.

FIG. 10 illustrates a process 1000 for manufacturing disposable cutlery. As described above, the process 1000 used to manufacture the disposable cutlery is substantially similar to the process 800 used to manufacture the disposable cutting board.

As shown in FIG. 10, the process 1000 includes a step 1002 of boiling a block of wood such as a section of a tree to remove sugars contained in the block of wood. In certain examples, the block of wood is cut from the stump or trunk of a soft or medium wood. In some examples, the block of wood is cut from the stump or trunk of an aspen tree, a birch tree, an *albizia falcataria* tree, or another similar type of tree.

The process 1000 includes a step 1004 of partially drying the boiled block of wood. An industrial dryer can be used to partially dry the boiled block of wood. In other examples, the boiled block of wood is dried naturally on its own (i.e., without using any machinery). In some examples, the boiled block of wood is dried both naturally and using an industrial dryer.

Next, the process 1000 includes a step 1006 of lathing the semi-dried block of wood to produce a semi-dried lathed section. The lathed section is a thin ribbon of wood. In certain examples, the lathing of the semi-dried block of wood produces a semi-dried lathed section having a thickness in a range of about 0.8 mm to about 1.5 mm. In certain examples, the lathed section has a thickness in a range of about 1.0 mm to about 1.2 mm.

The process 1000 includes a step 1008 of drying the semi-dried lathed section to produce a dried lathed section. In some examples, an industrial dryer is used to dry the semi-dried lathed section. In other examples, the semi-dried lathed section is dried naturally (i.e., without using any machinery). In some examples, the semi-dried lathed section is dried both naturally and using an industrial dryer.

Thereafter, the process 1000 includes a step 1010 of sanding the dried lathed section to produce a sanded section. An industrial sander can be used to sand the dried lathed section.

The process 1000 includes a step 1012 of impregnating the sanded section with a wax to produce a waxed sanded section. The wax fills in the spaces in the wood where the sugars have been removed in step 1002. Impregnating the sanded section with wax instead of coating the sanded section with a layer of wax is advantageous because it improves the tasting qualities of the disposable cutlery such that the disposable cutlery impregnated with wax does not give a dry wood taste even when chewed by a user. Also, impregnating the disposable cutlery with wax instead of coating it with wax improves the strength and durability of the disposable cutlery, makes the finished surface of the disposable cutlery smoother.

In some examples, the sanded section is impregnated with a wax such as a food grade wax including, but not limited to, Carnauba wax, beeswax, soy based wax etc. In certain examples, the wax can be impregnated into the sanded section using a tumble dryer that causes the wood to absorb the wax over a period of time. In other examples, a vacuum chamber can be used to impregnate the sanded section with wax by sucking air out of the pockets and crevices in the wood, and forcing the wax into the pockets and crevices in the wood.

Next, the process 1000 includes a step 1014 of pressing the waxed sanded section to remove air bubbles in the wood and the impregnated wax. In some examples, a multi-ton press or a suitable roller press is used to press the waxed sanded section.

Next, the process 1000 includes an additional drying step 1016. In certain examples, an industrial dryer is used to dry the waxed sanded section. In other examples, the waxed sanded section is dried naturally (i.e., without using any machinery). In some examples, the waxed sanded section is dried both naturally and using an industrial dryer.

The process 1000 next includes a step 1018 of cutting the waxed sanded section into a shaped form. In some examples, the shaped form is that of a fork. In other examples, the shaped form is that of a knife. In yet other examples, the shaped form is that of a spoon. While a fork, knife, and spoon are described herein, it is contemplated that the waxed sanded section can be cut into the shape of any type of cutlery, including any type of kitchen utensil and tool used for preparing, serving, and eating food including, but not limited to, forks, knives, and spoons.

In some examples, the process 1000 includes adding one or more ridges to at least a portion of the shaped form. In some examples, the one or more ridges are grooves around the outer edge of the shaped form. The additional surface area from the one or more ridges provides additional structural support for the disposable cutlery. Also, the one or more ridges may help to counteract the natural tendency of the wood to warp, which in turn, may help to counteract the effects of moisture and oils from various food items.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. A board comprising,
   a first outer layer and a second outer layer, at least the first outer layer comprising a wax paper having an inner surface and an outer surface; and
   a center layer having opposed outer surfaces and comprising a ribbon of wood, wherein the ribbon of wood is (i) substantially free of sugar, (ii) sanded, and (iii) has a thickness in the range of 0.9 mm 2.5 mm.
   wherein the inner surface of the first outer layer is (i) bonded and (ii) pressed to one of the outer surfaces of the center layer and the wax paper provides structural support to at least the center layer.

2. The board according to claim 1, wherein the second outer layer comprises a wax paper having an inner surface and an outer surface and the inner surface of the second outer layer is bonded to the other outer surface of the center layer.

3. The board according to claim 1, wherein the second outer layer comprises cork having an inner surface and an outer surface and the inner surface of the second outer layer is bonded to the other outer surface of the center layer.

4. The board according to claim 1, wherein the second outer layer comprises silicon having an inner surface and an outer surface and the inner surface of the second outer layer is bonded to the other outer surface of the center layer.

5. The board according to claim 1, wherein the board shaped as a cheeseboard.

6. The board according to claim 1, wherein the board is shaped as a charcuterie board.

7. The board according to claim 1, wherein the board is shaped as a pizza board.

8. The board according to claim 1, wherein the inner surface of the first outer layer is bonded to one of the outer surfaces of the center layer with an adhesive.

9. The board according to claim 8, wherein the adhesive is a starch-based adhesive.

10. The board according to claim 8, wherein the adhesive is a water-based adhesive.

11. The board according to claim 9, wherein the adhesive is a rice based adhesive.

12. The board according to claim 8, wherein the adhesive is misted onto one of the outer surfaces of the center layer.

\* \* \* \* \*

UNITED STATES PATENT AND TRADEMARK OFFICE
CERTIFICATE OF CORRECTION

PATENT NO. : 11,389,032 B2
APPLICATION NO. : 15/963169
DATED : July 19, 2022
INVENTOR(S) : Michael D. Dwork It is certified that error appears in the above-identified patent and that said Letters Patent is hereby corrected as shown below:

In the Claims

In Column 10, Line 39, Claim 1, "0.9 mm 2.5 mm." should read "0.9 mm – 2.5 mm."

Signed and Sealed this
Twenty-seventh Day of December, 2022

Katherine Kelly Vidal
Director of the United States Patent and Trademark Office